United States Patent
Pacchiana et al.

(10) Patent No.: US 7,134,476 B2
(45) Date of Patent: Nov. 14, 2006

(54) PROCESS FOR THE PRODUCTION OF A BRAKING BAND OF A BRAKE DISK WITH VENTILATION DUCTS AND A BRAKING BAND PRODUCED BY THIS PROCESS

(75) Inventors: Giovanni Paolo Pacchiana, Locate (IT); Ralf Siegfried Goller, Bergamo (IT)

(73) Assignee: Freni Brembo S.p.A., Curno (IT)

( * ) Notice: Subject to any disclaimer, the term of this patent is extended or adjusted under 35 U.S.C. 154(b) by 89 days.

(21) Appl. No.: 10/484,799

(22) PCT Filed: Jul. 27, 2001

(86) PCT No.: PCT/IT01/00411

§ 371 (c)(1),
(2), (4) Date: Jan. 27, 2004

(87) PCT Pub. No.: WO03/012310

PCT Pub. Date: Feb. 13, 2003

(65) Prior Publication Data

US 2004/0216856 A1    Nov. 4, 2004

(51) Int. Cl.
*B22D 19/00* (2006.01)
*C04B 33/34* (2006.01)

(52) U.S. Cl. .................... 164/98; 164/369; 164/132; 188/218 XL; 188/251 R; 156/89.26

(58) Field of Classification Search ................ 164/98, 164/132, 120, 369; 188/218 XL, 251 R, 188/251 A; 156/89.26
See application file for complete search history.

(56) References Cited

U.S. PATENT DOCUMENTS

| 4,927,712 A * | 5/1990 | Lhymn et al. .............. 428/614 |
|---|---|---|
| 5,263,531 A | 11/1993 | Drury et al. |
| 6,328,834 B1 * | 12/2001 | Rebstock et al. ........ 156/89.26 |
| 6,564,856 B1 * | 5/2003 | Buckley ..................... 164/132 |

FOREIGN PATENT DOCUMENTS

| DE | 435 917 | 10/1926 |
|---|---|---|
| EP | 0 143 264 A1 | 6/1985 |
| EP | 1 018 381 A2 | 7/2000 |
| GB | 2 269 771 A | 2/1994 |
| WO | 96/26799 | 9/1996 |
| WO | 99/20417 | 4/1999 |
| WO | 41982 | * 7/2000 |

* cited by examiner

OTHER PUBLICATIONS

International Search Report dated May 6, 2002, for Application No. PCT/IT01/00411.

*Primary Examiner*—Kevin Kerns
*Assistant Examiner*—I.-H. Lin
(74) *Attorney, Agent, or Firm*—Hogan & Hartson LLP

(57) ABSTRACT

A process for the production of a braking band having ventilation ducts comprises the steps of a) moulding a core of metallic material, b) inserting the core in a mould, in a central position, c) filling the mould with at least two layers of material which are to form the braking band, in a manner such that the core is "sandwiched" between the at least two layers, d) performing a first heating of the mould to a temperature such as to bring about hardening of the at least two layers until the at least two layers adopt a three-dimensional structure, e) subjecting the semi-finished product produced in step d) to a second heating to a temperature such as to bring about fusion of the metallic material of the core, and f) collecting the molten core.

22 Claims, 3 Drawing Sheets

PROCESS FOR THE PRODUCTION OF A BRAKING BAND OF A BRAKE DISK WITH VENTILATION DUCTS AND A BRAKING BAND PRODUCED BY THIS PROCESS

CROSS-REFERENCE TO RELATED APPLICATION

This application is a 371 of PCT/IT01/00411 filed on Jul. 27, 2001.

BACKGROUND OF THE INVENTION

The present invention relates to a process for the production of a braking band of a brake disk with ventilation ducts and to a braking band produced by this process.

In particular, the present invention relates to a process for the production of a braking band having ventilation ducts and made of a ceramic material such as, for example, C/SiC.

The ventilation ducts of braking bands which are currently commercially available are generally produced by various methods.

A first method provides for the moulding of the braking band as a solid body and the subsequent formation of radial and non-radial holes lying in the central plane of the thickness of the band and constituting the ventilation ducts.

A second method for the production of braking bands of ceramic material for a brake disk with ventilation ducts provides, in a first step, for the separate moulding of two reflectively symmetrical portions of the braking band, which have channels within their respective surfaces that face one another. The two portions are then brought into contact and joined together to form the finished band in which the channels of each of the portions together define the ventilation ducts.

In a third method, the ventilation ducts are produced by means of a core of ceramic material which is inserted in the mould, between two layers of the material for forming the band, and which already has in its interior the cavities which will constitute the ventilation ducts. Since it is made of material identical or at least similar to that of the band, the core becomes closely connected to the ceramic material of the braking band, forming a ceramic "sandwich" structure therewith. The core itself is formed by two half-cores arranged facing one another and joined together in a similar manner to that described for the braking band of the above-mentioned second production method.

However, the above-mentioned methods have some problems and disadvantages connected mainly with technological difficulties.

In the first method, the formation of the holes in the thickness of the braking bands is in fact very expensive and difficult because of the hardness of the materials used. Moreover, the machining inside the braking band is much less controllable than the external machining of the band. During this machining, it is consequently not possible to exclude the formation of sharp edges or even cracks, which cannot be tolerated in the production of a braking band.

The second method, on the other hand, has the disadvantage of the need to join together two portions of a braking band which, since they are moulded separately, may not correspond and may therefore fit together unevenly. This could give rise to a product in which dangerous detachment of these two portions due to non-symmetrical forces can easily occur.

With regard to the third method, this requires the provision of two moulds for the moulding of the respective half-cores, as well as a third mould for the moulding of the braking band. Moreover, in order to achieve satisfactory results, the core produced by means of the two half-cores has to be positioned very accurately inside the mould for moulding the braking band. All of this requires quite complex techniques as well as manual intervention in every moulding cycle. The above-mentioned technological complexities, as well as the resulting costs, also reduce the competitiveness of brake disks of ceramic material with ventilation ducts, in comparison with non-ventilated disks.

There is consequently a need to provide a process for the production of braking bands with ventilation ducts which is particularly easy to implement and economical.

SUMMARY OF THE INVENTION

The problem underlying the present invention is therefore that of providing a process for the production of braking bands which has characteristics such as to satisfy the above-mentioned needs and, at the same time, to overcome the disadvantages of the methods of the prior art.

This problem is solved by a process for the production of a braking band as defined in the appended method claims.

A second subject of the present invention is a metal core for forming cavities within a ceramic material, as defined in the appended product claims.

A third subject of the present invention is a braking band which can be produced by the process of the present invention, as defined in the appended product claims.

The Applicant of the present invention has in fact selected a particular material for the formation of the core and particular temperature ranges in which the material which is to form the braking band hardens, adopting a three-dimensional structure, and in which the material of a core "sandwiched" between the layers which are to form the braking band melts. This enables a braking band provided with ventilation ducts produced in the void left by the melted core to be produced more simply and economically than those of the prior art.

The expression "three-dimensional structure", referring to the material which is to form the braking band of the present invention, is intended to mean that the material has a configuration such as not to collapse on itself at the temperature at which the core starts to melt.

BRIEF DESCRIPTION OF THE DRAWINGS

Further characteristics and the advantages of the process for the production of braking bands, as well as braking bands produced by the process according to the present invention will become clear from the following description of some preferred embodiments thereof, given by way of non-limiting example, with reference to the appended drawings, in which.

DETAILED DESCRIPTION OF THE PREFERRED EMBODIMENTS

Figure 1:
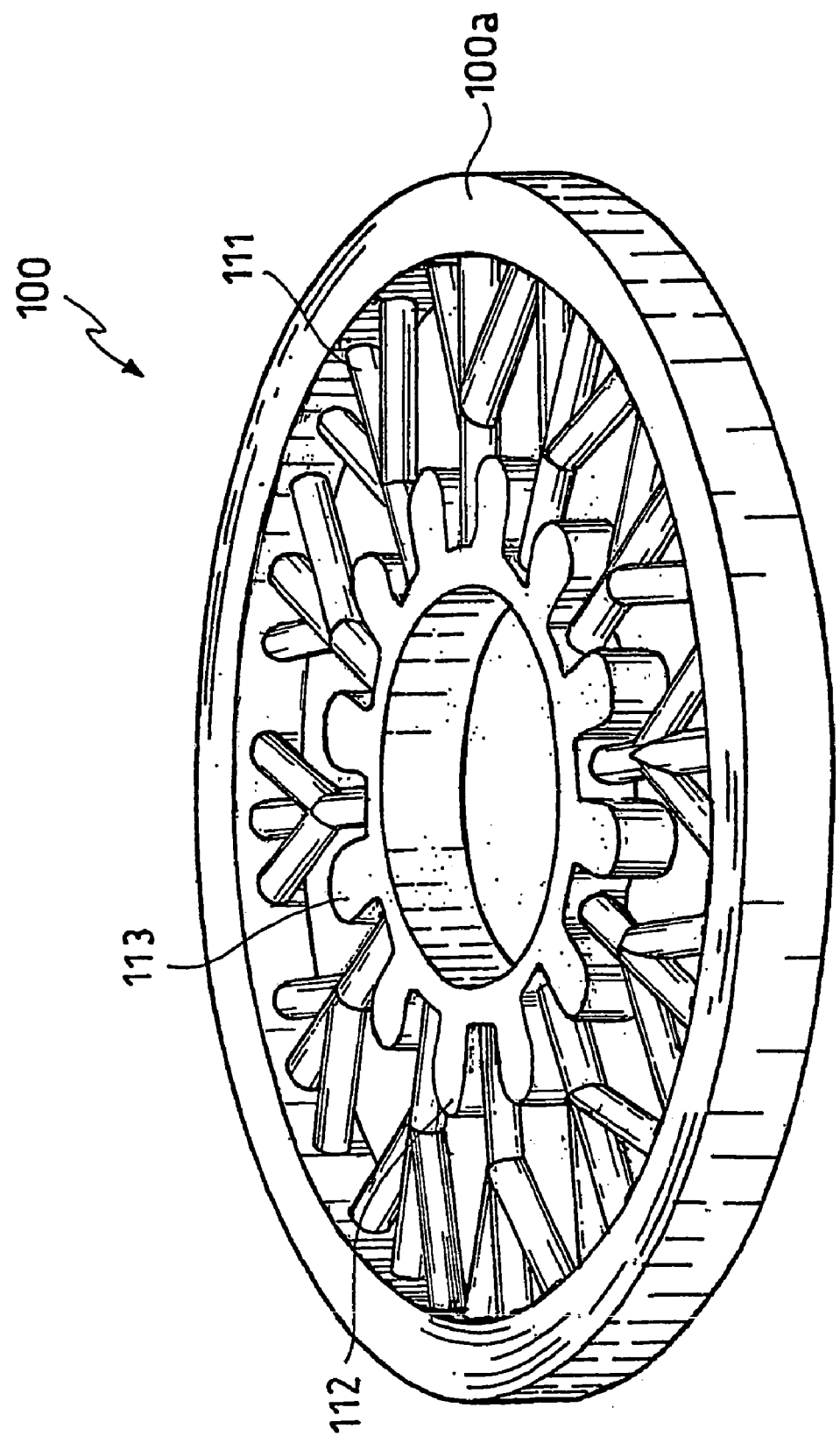
FIG. 1 is a schematic, perspective view of the core by means of which the ventilation ducts of the braking band according to the invention are produced.

As shown in FIG. 1, the core 100 is formed by an outer peripheral ring known as the core support 100a and by an inner peripheral ring 112, which are connected to one another by connecting elements 111 by means of which the ventilation ducts of the braking band are produced.

The inner peripheral ring 112 has projecting portions 113 which extend for a predetermined distance towards the core support 100a. In particular the projecting portions 113 are such as to form corresponding seats for housing the teeth of a brake-disk bell.

The connecting elements 111 by means oL which the ventilation ducts of the braking band are produced, may also be arranged at irregular intervals and may be inclined to one another.

Moreover, the connecting elements 111 may have many different shapes such as, for example, shapes which impart to the ventilation ducts 11 of the braking band substantially circular or prismatic cross-sections.

The core 100 is made of metal and is produced in a conventional mould.

Typical examples of these moulds are a die-casting mould or permanent moulds.

The core 100 is preferably made of a metal alloy which can melt at a temperature of between 150 and 450° C.

Preferred examples of these metal alloys are those selected from the group comprising tin-based and zinc-based alloys.

Examples of these tin-based alloys are Sn—Pb and Sn—In alloys. Preferably, they are the Sn—Pb alloy having 37% w/w of Pb and the Sn—In alloys having from 10 to 20% w/w of In, in particular, the Sn—In alloy having 15% w/w of In, at the eutectic. Even more preferably, the tin-based alloy is the Sn—Pb alloy having 37% w/w of Pb at the eutectic.

An example of a suitable zinc-based alloy is Zn—Al alloy. Preferably, it is the Zn—Al alloy having 4% w/w of Al.

According to one embodiment of the present invention, when the metal core 100 is a tin-based alloy, it can melt at a temperature of between 150 and 250° C., preferably between 180 and 220° C.

According to a further embodiment of the present invention, when the metal core 100 is a zinc-based alloy, it can melt at a temperature of between 250 and 450° C., preferably between 300 and 400° C.

The above-mentioned core of metallic material can therefore be used to form a cavity inside any body of ceramic material such as, for example, C/SiC.

In order to mould the braking band according to the present invention, the core 100 is inserted in a suitable mould.

This step of the moulding of the braking band will now be described with reference to FIG. 2.

Figure 2:
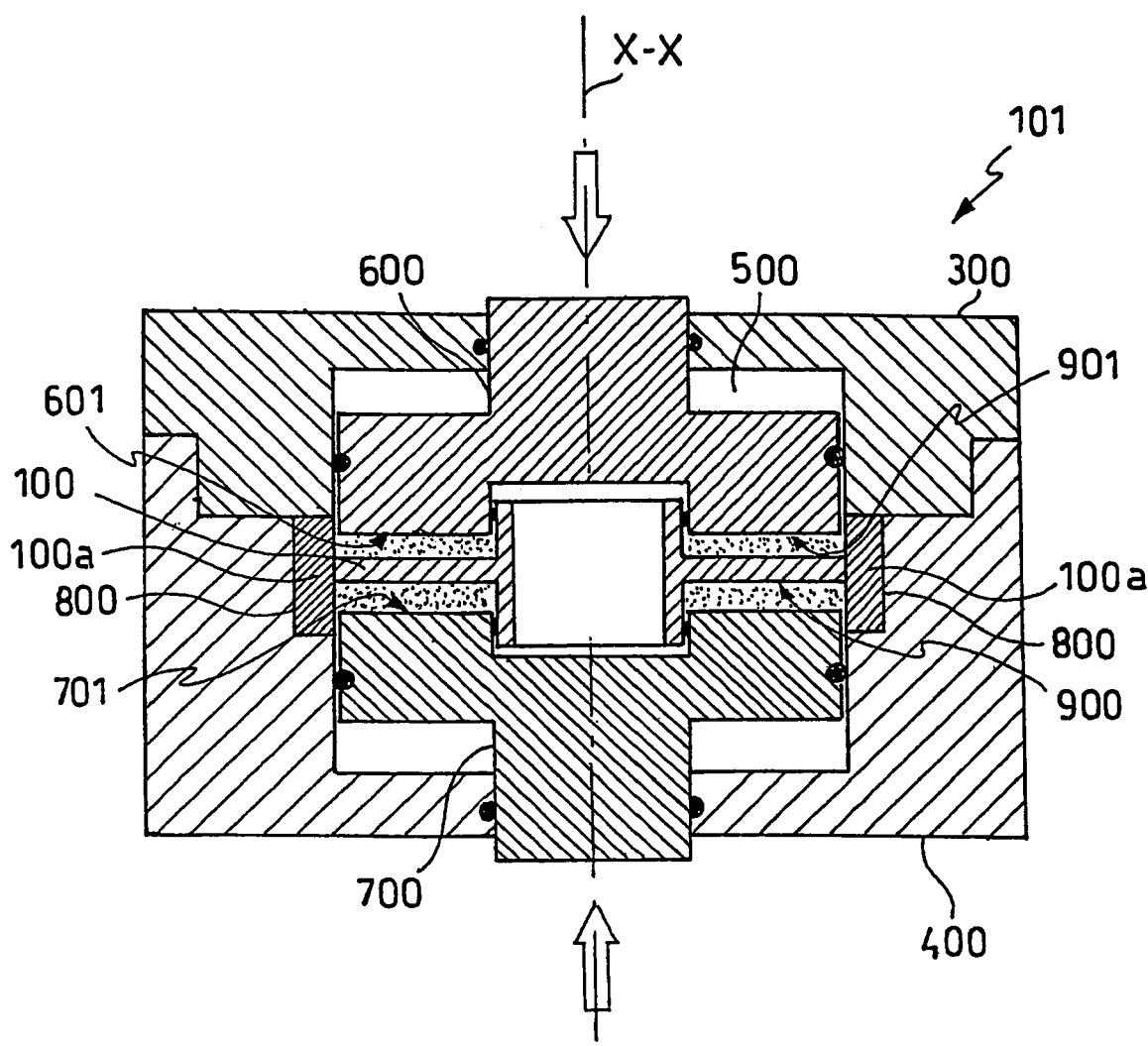
FIG. 2 is a view showing, in section, a mould in the operative stage for the moulding of the braking band according to the invention.

FIG. 2 shows schematically the mould, generally indicated 101.

The mould 101 comprises two plates 300 and 400 which, in operative conditions, are coupled so as to define a moulding cavity 500.

Two opposed pistons 600 and 700 are mounted inside the moulding cavity 500 and can slide along a common axis X—X. The pistons 600 and 700 are constructed in a manner such as to seal against the internal walls of the moulding cavity 500.

In particular, the mould 101 has housings 800 for housing the core support 100a of the core 100, between the two pistons 600, 700.

The step of the moulding of the braking band with the use of the above-mentioned mould will now be described below, with reference to FIG. 2.

Initially, when the mould 101 is in the open configuration (not shown), that is, when the two plates 300 and 400 with the respective pistons 600 and 700 are spaced apart, a layer 900 of a mixture in the solid state is deposited in the moulding cavity 500.

Typically, the solid-state mixture of the layer 900 comprises fibres and/or filaments of carbon-based materials selected from the group consisting of fibrous materials produced by pyrolysis of various products of synthetic origin, for example, polyacrylonitrile (PAN) and polysilazane, or of natural origin, for example, pitches, natural cellulose-based sources, such as vegetable fibres and wood.

These materials are mixed with a binder such as, for example, a phenolic resin, an acrylic resin, a paraffin, pitches, and polystyrenes.

The binder is preferably selected from the group comprising pitches and phenolic resins.

The binder may be added to the mixture in any desired form, for example, in the solid, semi-liquid, or liquid state, or in solution.

For example, the phenolic resin may be added in the form of pellets, powder, or granules.

The content of organic binder in the mixture may vary from 5% to 30% by volume, relative to the volume of the mixture, and is preferably within the range of 20% –26%.

The mixture may also contain further conventional additives used as fillers and, indirectly, for regulating the porosity and the density of the desired composite material.

These additives are constituted by particles of inorganic materials such as, preferably, powders of graphite, silicon carbide, or metal carbides or nitrides.

The content of additives in the mixture may vary from 0.7% to 23% by volume, relative to the volume of the mixture, and is preferably within the range of 9% –15%.

As shown in FIG. 2, the layer 900 is deposited on the surface 701 of the piston 700 which faces the piston 600 of the plate 300.

The core 100 is then positioned on top of the layer 900 so as to cover it and, at the same time, in a manner such as to be kept suspended and not to sink into the mixture. This suspension is achieved by means of the core support 100a of the core 100.

After the core 100 has been positioned in the moulding cavity 500, a further layer 901 of the above-mentioned mixture is deposited on top of the core 100 so as to produce a layered arrangement.

At this point, the mould 101 can be closed so that the lower surface 601 of the piston 600 comes into contact with the layer 901.

The braking band is moulded by a first heating stage, to a temperature and at a pressure exerted by the pistons 600 and 700 on the layers of mixture 900 and 901, which are such as to bring about hardening of the layers 900 and 901 until they adopt a three-dimensional structure.

Typically, this first heating stage is performed at a temperature of between 80 and 180° C. and at a pressure of between 0.1 and 5 N/cm$^2$. Advantageously, the first heating stage is performed at a temperature of approximately 150° C. and at a pressure of approximately 1 N/cm$^2$.

The semi-finished product thus produced is then removed from the appropriate mould and placed in a conventional furnace.

In the furnace, the semi-finished product is subjected to a second heating stage, to a temperature such as to melt the core 100. Once molten, the metallic material constituting the core 100 is collected in a crucible for reuse.

Advantageously, no cooling is performed between the first and second heating stages.

The second heating stage is performed at a temperature which depends substantially on the type of metal of which the core 100 is formed.

As stated above, for a core 100 of tin-based alloy, the temperature of the second heating stage is preferably between 150 and 250° C., even more preferably between 180 and 220° C., whereas, if the core 100 is a zinc-based alloy, the temperature of the second heating stage is preferably between 250 and 450° C., even more preferably between 300 and 400° C.

The above-mentioned second heating stage leads to a semi-finished product comprising ventilation ducts in the empty space left by the discharge of the molten core 100.

In a preferred embodiment of the present invention, the first and second heating stages are performed in a single mould.

Upon completion of the second heating stage, the semi-finished product may be treated in accordance with the prior art in the production of braking bands.

Typical examples of these treatments are pyrolysis and silication. They are preferably performed as described in the Applicant's European patent application No. 00830093.1 which is included herein by reference insofar as it relates to the above-mentioned pyrolysis and silication treatments in which pyrolysis takes place at a temperature of between 900 and 1200° C. and in the presence of a stream of inert gas such as nitrogen and argon and with an extra pressure of 10–100 mbar and the silication is performed at a temperature of 1400–1700° C. under vacuum, reducing the pressure from 900 mbar to 300 mbar.

Moreover, if necessary, the braking band according to the invention thus produced may be subjected to finishing operations, for example, surface finishing which may be performed dry or wet, in conventional manner, by means of a grinding operation.

Moreover, it is known that, in some cases, braking bands made of the materials described above may give rise to possible cracks or fractures as a result of thermal and/or compression stresses to which a braking band is subjected during use. These cracks or fractures tend to propagate rapidly throughout the structure of a braking band and may cause it to disintegrate completely.

Advantageously, a plurality of reinforcing fibres may be introduced into the mixture for the moulding of the braking band described above to impede the propagation of cracks.

Examples of these reinforcing fibres and of their incorporation in the mixture which is to form the braking band are described in the Applicant's European patent application No. 00830093.1 which is included herein by reference insofar as it relates to the above-mentioned reinforcing fibres and their incorporation.

Figure 3:
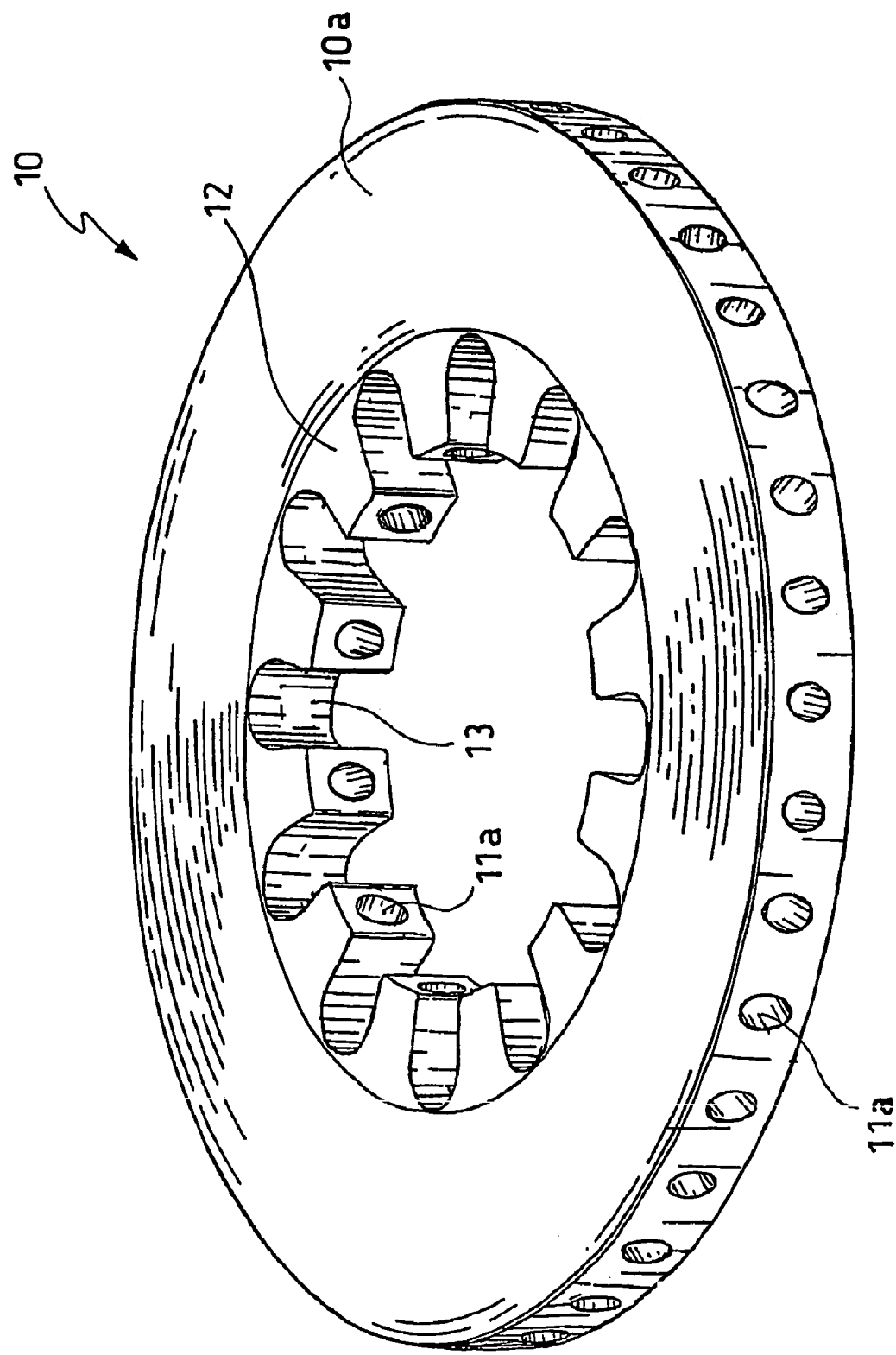
FIG. 3 is a perspective view of the braking band according to the invention.

FIG. 3 shows a braking band 10 containing internal ventilation ducts (not shown) in the empty space left by the discharge of the molten core 100.

The braking band 10 also has an outer peripheral edge 10a having openings 11a corresponding to the ventilation ducts described above and an inner peripheral edge 12 provided with seats 13 such as to house corresponding teeth of a bell of a brake disk (not shown).

The advantages of the process for the production of the braking band of the present invention are clear from the foregoing.

A first advantage is that the core, by means of which the ventilation ducts of the braking band of the present invention are produced, is made of a material that can start to melt at a temperature at which the material that is to form the braking band has already adopted a three-dimensional structure. This enables the ventilation ducts to be formed without causing the collapse of the braking band being moulded on the core.

A second advantage is that the core is made of a material which has good flow characteristics. The steps of the filling of the mould and of the collection of the material of the molten core are thus facilitated. Moreover, this prevents residues of the material which forms the core remaining attached to the braking band which is being moulded.

A third advantage is that the process for the production of a braking band according to the invention is inexpensive to implement.

A fourth advantage of the process is that it can be carried out in a single mould. This permits a further reduction in costs.

In addition, the presence of the core support 100a provides a suitable support for the core and, at the same time, achieves optimal balancing of the pressures exerted by the two pistons 600 and 700 during the step of the moulding of the braking band.

The present invention is thus realized by the provision of a simple and economical process that can also produce a braking band which has the necessary safety characteristics from the structural point of view, and which is easy to produce.

Naturally, in order to satisfy contingent and specific requirements, a person skilled in the art may apply to the above-described process and to the braking band many modifications and variations all of which, however, are included in the scope of the invention as defined by the appended claims.

What is claimed is:

1. A process for the production of a braking band having ventilation ducts, comprising the steps of:
   a) moulding a core of metallic material,
   b) inserting the core in a mould, in a central position,
   c) filling the mould with at least two layers of material which are to form the braking band, in a manner such that the core is sandwiched between the at least two layers,
   d) performing a first heating of the mould to a first temperature such as to bring about hardening of the at least two layers until the at least two layers adopt a three-dimensional structure,
   e) subjecting the semi-finished product produced in step d) to a second heating from said first temperature to a second temperature such as to bring about fusion of the metallic material of the core, and
   f) collecting the molten core.

2. A process according to claim 1 in which the core is a metal alloy which can melt at a temperature of between 150 and 450° C.

3. A process according to claim 2 in which the core of metallic material is an alloy selected from the group consisting of tin-based alloys and zinc-based alloys.

4. A process according to claim 3 in which the tin-based alloys are selected from the group consisting of Sn—Pb and Sn—In alloys.

5. A process according to claim 4 in which tin-based alloys are selected from the group consisting of Sn—Pb alloys having 37% w/w of Pb and Sn—In alloys having from 10 to 20% w/w of In at the eutectic.

6. A process according to claim 5 in which the tin-based alloy is the Sn—Pb alloy having 37% of Pb w/w at the eutectic.

7. A process according to claim 5 in which the alloy is Sn—In having from 10 to 20% w/w of In at the eutectic.

8. A process according to claim 3 in which the zinc-based alloy is Zn—Al alloy.

9. A process according to claim 8 in which the zinc-based alloy is the Zn—Al alloy having 4% w/w of Al.

10. A process according to claim 1 in which, in step d), the first heating is performed at a temperature of between 80 and 180° C. and at a pressure of between 0.1 and 5 N/cm².

11. A process according to claim 10 in which the first heating is performed at a temperature of approximately 150° C. and a pressure of approximately 1 N/cm².

12. A process according to claim 1 in which, in step e), the second heating is performed at a temperature of between 150 and 450° C.

13. A process according to claim 12 in which the core is a tin-based alloy and the second heating is performed at a temperature of between 150 and 250° C.

14. A process according to claim 13 in which the second heating is performed at a temperature of between 180 and 220° C.

15. A process according to claim 12, in which the core is a zinc-based alloy and the second heating is performed at a temperature of between 250 and 450° C.

16. A process according to claim 15 in which the second heating is performed at a temperature of between 300 and 400° C.

17. A process according to claim 1 in which step f) is followed by a step of reuse of the molten metallic material constituting the core.

18. A core of metallic material for forming a cavity within a body of a ventilated ceramic braking band, said core comprising an outer peripheral ring and an inner peripheral ring joined by a plurality of connecting elements, said connecting elements being adapted to form the share of ventilation ducts in a resulting band, and said outer peripheral ring having core support means adapted to hold said core securely within a mould for said ceramic braking band, and wherein said core is comprised of a metal alloy that can melt at a temperature of between 150 and 450° C. selected from the group consisting of tin-based alloys and zinc-based alloys.

19. A core of metallic material for forming a cavity within a body of ceramic braking band according to claim 18, wherein said alloy is a Zn—Al alloy.

20. A core of metallic material for forming a cavity within a ceramic braking band according to claim 18, wherein said alloy is a tin-based alloy adapted to melt at a temperature of between 150 and 250° C.

21. A core of metallic material for forming a cavity within a ceramic braking band according to claim 18, wherein said alloy is a zinc-based alloy adapted to melt at a temperature of between 250 and 450° C.

22. A core of metallic material for forming a cavity within a body of ceramic braking band according to claim 18, wherein said core is comprised of a tin-based alloy selected from the group consisting of Sn—Pb and Sn—In alloys.

* * * * *